(12) United States Patent
Abate et al.

(10) Patent No.: US 7,581,746 B2
(45) Date of Patent: Sep. 1, 2009

(54) FIFTH WHEEL TRAILER HITCH COUPLING UNIT

(75) Inventors: Vito J. Abate, Toronto (CA); Grzegorz M. Kardasz, Richmond Hill (CA); Raymond J. Minato, Toronto (CA); Peter Bradley, Pickering (CA)

(73) Assignee: Magna International Inc., Aurora, Ontario (CA)

( * ) Notice: Subject to any disclaimer, the term of this patent is extended or adjusted under 35 U.S.C. 154(b) by 603 days.

(21) Appl. No.: 11/400,879

(22) Filed: Apr. 10, 2006

(65) Prior Publication Data

US 2006/0255559 A1 Nov. 16, 2006

Related U.S. Application Data

(60) Provisional application No. 60/669,469, filed on Apr. 8, 2005.

(51) Int. Cl.
 *B60D 1/62* (2006.01)
 *B62D 53/12* (2006.01)
 *F16D 1/04* (2006.01)
(52) U.S. Cl. .................. 280/422; 280/434; 403/321
(58) Field of Classification Search ............... 280/422, 280/423.1, 434, 441.1; 403/316, 320, 321, 403/379.2; 74/813 L
See application file for complete search history.

(56) References Cited

U.S. PATENT DOCUMENTS

| | | | | |
|---|---|---|---|---|
| 1,397,688 A | * | 11/1921 | Keesler et al. | 280/438.1 |
| 1,926,264 A | * | 9/1933 | Connors | 280/422 |
| 2,667,365 A | | 1/1954 | Hollifield | |
| 3,181,887 A | * | 5/1965 | Boylan et al. | 280/421 |
| 3,391,950 A | | 7/1968 | Carter et al. | |
| 3,647,243 A | * | 3/1972 | Nagy et al. | 280/433 |
| 3,650,546 A | * | 3/1972 | Koenig | 280/423.1 |

(Continued)

*Primary Examiner*—Lesley D Morris
*Assistant Examiner*—Daniel Yeagley
(74) *Attorney, Agent, or Firm*—Clarkhill PLC

(57) ABSTRACT

A trailer hitch coupling unit has a hitch pin assembly mounted on a trailer and a hitch receiver assembly mounted on a vehicle. The hitch pin assembly has a mounting plate and a platform forming a ball and socket joint therebetween, rotatably coupling the platform to the mounting plate. A bull nose, having a groove, projects from the bed plate. A first electrical connector is mounted in an axially extending bore in the bull nose. The hitch receiver assembly has a bed plate configured to be mounted on a bed of the vehicle above a rear axle thereof. The bed plate has a first opening configured to receive the bull nose. A locking plate is mounted on the bed plate for axial movement between a hitch pin receiving position adjacent the bed plate, and a hitch locking position spaced from the bed plate. The locking plate has a second opening configured to receive the bull nose. An actuator is operably connected to the locking plate for effecting the axial movement. A locking mechanism has at least two locking arms mounted about the second opening and pivot between a locked position and an unlocked position and are biased to the locked position, enabling ingress of the bull nose and preventing egress once the locking arms engage the groove on the bull nose. A lock release mechanism is operably connected to the locking arms to effect unlocking movement of the locking arms and enabling egress of the bull nose. A second electrical connector is pivotally mounted on the locking plate and positioned to electrically couple with the first electrical connector upon the locking plate moving to the hitch locking position.

4 Claims, 9 Drawing Sheets

U.S. PATENT DOCUMENTS

| | | | |
|---|---|---|---|
| 3,827,722 A * | 8/1974 | Miller et al. | 280/432 |
| 3,912,411 A * | 10/1975 | Moffat | 403/259 |
| 3,941,408 A | 3/1976 | Petersson | |
| 4,283,072 A | 8/1981 | Deloach, Jr. | |
| 5,326,123 A | 7/1994 | Guest et al. | |
| 5,472,223 A | 12/1995 | Hawthorne et al. | |
| 5,909,891 A * | 6/1999 | Swart et al. | 280/422 |
| 6,264,229 B1 * | 7/2001 | Gill et al. | 280/441.2 |
| 6,481,738 B1 | 11/2002 | Duncan et al. | |
| 6,520,527 B2 | 2/2003 | Laarman | |
| 6,540,246 B2 * | 4/2003 | Andersen et al. | 280/417.1 |
| 6,767,155 B2 * | 7/2004 | O'Brien et al. | 403/322.1 |
| 6,935,650 B2 * | 8/2005 | Grinde et al. | 280/435 |
| 6,971,660 B1 * | 12/2005 | Putnam | 280/416.1 |
| 7,163,226 B1 * | 1/2007 | Norton et al. | 280/433 |

* cited by examiner

US 7,581,746 B2

FIFTH WHEEL TRAILER HITCH COUPLING UNIT

RELATED APPLICATION

This application claims priority to and all the benefits of U.S. Provisional patent application Ser. No. 60/669,469, filed Apr. 8, 2005.

FIELD OF INVENTION

The invention relates to a hitch for coupling a trailer to a vehicle. In particular, this invention relates to a fifth wheel trailer coupling unit.

BACKGROUND OF INVENTION

Traditional hitch receivers generally are constructed of welded steel tubing and profile cut flat plate. Steel has long been the material of choice due to its availability, low cost and knowledge in how to work with it.

Referring to FIG. 1, the diagram illustrates a very common ball and socket type of hitch mechanism that has been in use for many years. The ball (10) is mounted either to the hitch frame (40) or to a removable bar (20) that fits into and is pinned to a tube (30) integral to the hitch frame. The socket housing (50) is connected to the trailer and contains a lever (51) to pull a locking mechanism up under the ball (10) once connected. Two safety chains (52) are connected to the socket housing (50) and are manually clipped to the vehicle hitch frame (41). The electrical connection is manually made with a multi-conductor connector. One side of the connector (26) is on a cable wired to the trailer and the other side of the connector (25) is wired to the tow vehicle.

Hitch configurations of many types have been constructed ranging from ball and socket arrangements for light duty applications to heavy-duty fifth wheel arrangements used on transport trucks.

Referring to FIG. 2, the diagram illustrates a common fifth wheel hitch that has been in use for many years. A hitch frame (80) is attached to the body of the truck and supports the hitch mechanism (90). A ramp and skid plate (91) is used to guide the hitch pin (92), mounted on the trailer frame (93), into a retaining slot (94). Under the skid plate (91) are two spring loaded locking arms (96) and (97) that capture the hitch pin (92). These locking arms (96) and (97), by design, are self-energizing such that as the hitch pin (91) loading increases, the locking arms (96) and (97) close together more tightly. A locking bar (95) is then manually positioned to further prevent the locking arms from opening. Safety chains are not needed with this type of hitch because of the redundancy of this locking bar (95). The electrical connection is manually made with a multi-conductor connector similar to (25) and (26) in FIG. 1.

Referring to FIG. 3, the diagram illustrates a common goose neck (100) type of hitch mechanism. In this system the ball (101) is typically mounted to the middle of pickup truck bed (103) and the socket mechanism (102) is fastened to the trailer frame (110) that reaches up, over and down into the pickup truck bed. Function and connection of these components is similar to that of a standard ball and socket arrangement as shown in FIG. 1.

The current hitch types on the market today have issues with noise, vibration and harshness (NVH) due to their large manufacturing tolerances. The movement between the receiver and the hitch pin results in considerable noise as the pin bumps back and forth in the loose receiver opening. While this is usually not a safety issue, it is uncomfortable and unsettling for the occupants of the vehicle.

During connection to the vehicle it is usually necessary for the driver to have a helper guide the vehicle when backing towards the trailer. Otherwise the driver must get out and keep checking the position of the vehicle. Remotely operated hitch mechanisms are available.

The connection of the trailer to the vehicle may involve the operator to manually push the trailer to a closer alignment position before lowering the trailer with a hand crank or electric jacking device. The connection is secured manually by a locking lever, and a safety pin used to hold the lever down.

The electrical connection is made between the vehicle and the trailer by manually plugging together a multi-conductor connector. This is to provide power for lighting and braking if necessary.

SUMMARY OF INVENTION

The disadvantages of the prior art may be overcome by providing a hitching mechanism that enables an operator to couple a trailer to a vehicle merely by backing the vehicle into position and automatically hitching the vehicle to the trailer, including all mechanical and electrical connections.

It is desirable to provide a connection with two rigid components that are cinched securely together eliminating any NVH issues.

It is desirable to provide a connection that enables an articulating motion by the use of a high tolerance spherical bearing, providing the required pitch, roll and yaw range of motion for the trailer.

It is further desirable to eliminate the need for safety chains.

According to one aspect of the invention, there is provided a hitch mechanism that utilizes a high tolerance spherical bearing with seals to provide minimal maintenance and long life. This bearing will provide all motion required by the trailer and also eliminate any NVH issues as compared to other hitch types. A solid connection is made between the hitch pin (trailer) and the bed plate (vehicle). The pin is guided into the bed plate opening, due to the sloped entry, where it is captured by two locking arms. It is then pulled down and held tightly in place with no movement possible between these two pieces. This tight connection in combination with the spherical bearing provides a very smooth operating hitch unit.

According to another aspect of the invention, there is provided a trailer hitch coupling unit that has a hitch pin assembly mounted on a trailer and a hitch receiver assembly mounted on a vehicle. The hitch pin assembly has a mounting plate and a platform forming a ball and socket joint therebetween, rotatably coupling the platform to the mounting plate. A bull nose having a groove projects from the bed plate. A first electrical connector is mounted in an axially extending bore in the bull nose. The hitch receiver assembly has a bed plate configured to be mounted on a bed of the vehicle above a rear axle thereof. The bed plate has a first opening configured to receive the bull nose. A locking plate is mounted on the bed plate for axial movement between a hitch pin receiving position adjacent the bed plate, and a hitch locking position spaced from the bed plate. The locking plate has a second opening configured to receive the bull nose. An actuator is operably connected to the locking plate for effecting the axial movement. A locking mechanism is mounted on the locking plate. The locking mechanism has at least two locking arms mounted about the second opening and pivot between a locked position and an unlocked position and are biased to the locked position, enabling ingress of the bull nose and preventing egress once the locking arms engage the groove on the bull nose. A lock release mechanism is operably connected to the locking arms to effect unlocking movement of the locking arms and enabling egress of the bull nose. A second electrical connector is pivotally mounted on the locking plate and positioned to electrically couple with the first electrical connector upon the locking plate moving to the hitch locking position.

According to another aspect of the invention, there is provided a hitching procedure that requires very little operator intervention and is designed to eliminate any heavy lifting, pushing, or straining by the operator. The electrical connection is made automatically once the hitch pin is connected and will transmit 12V power, ground, and a serial bus signal for all functions within the trailer. The wiring harness and connector is integral to the hitch pin and receiver so as not to be seen externally. A swivel connector located inside the pin will allow the continuous rotation of the hitch pin while causing no damage to the electrical wires.

BRIEF DESCRIPTION OF THE DRAWINGS

The foregoing and other aspects of the invention will become more apparent from the following description of illustrative embodiments thereof and the accompanying drawings, which illustrate, by way of example only, the principles of the invention. In the drawings.

DETAILED DESCRIPTION OF THE PREFERRED EMBODIMENT

This invention relates to a method of coupling a Class I, II or III trailer to a personal vehicle. The mechanism involved is designed to operate with minimal operator involvement and to eliminate difficulties in aligning the vehicle with the hitch location. The mechanical connection is designed to reduce NVH factors in the vehicle when driven and the electrical connection for lighting and braking is done automatically during the hitching procedure.

Figure 1:
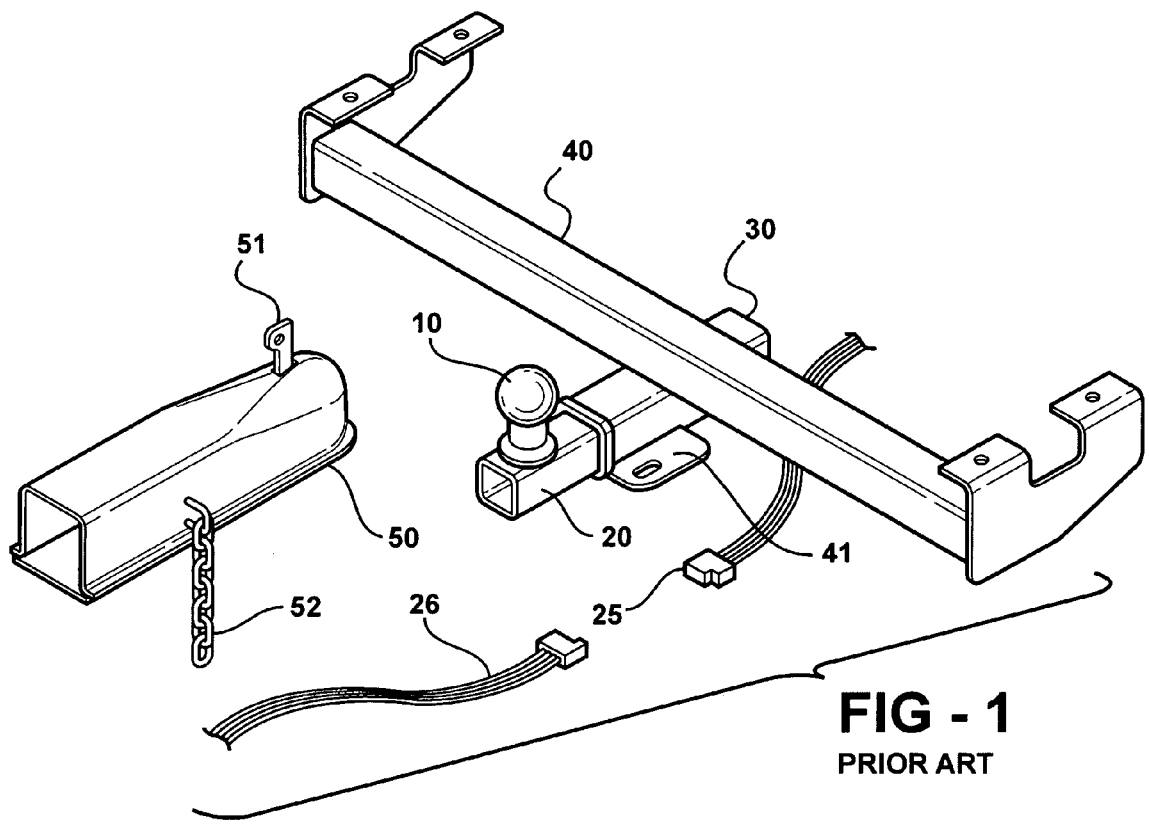
FIG. 1 is a perspective view of a prior art ball and socket type of hitch mechanism.
Figure 2A:
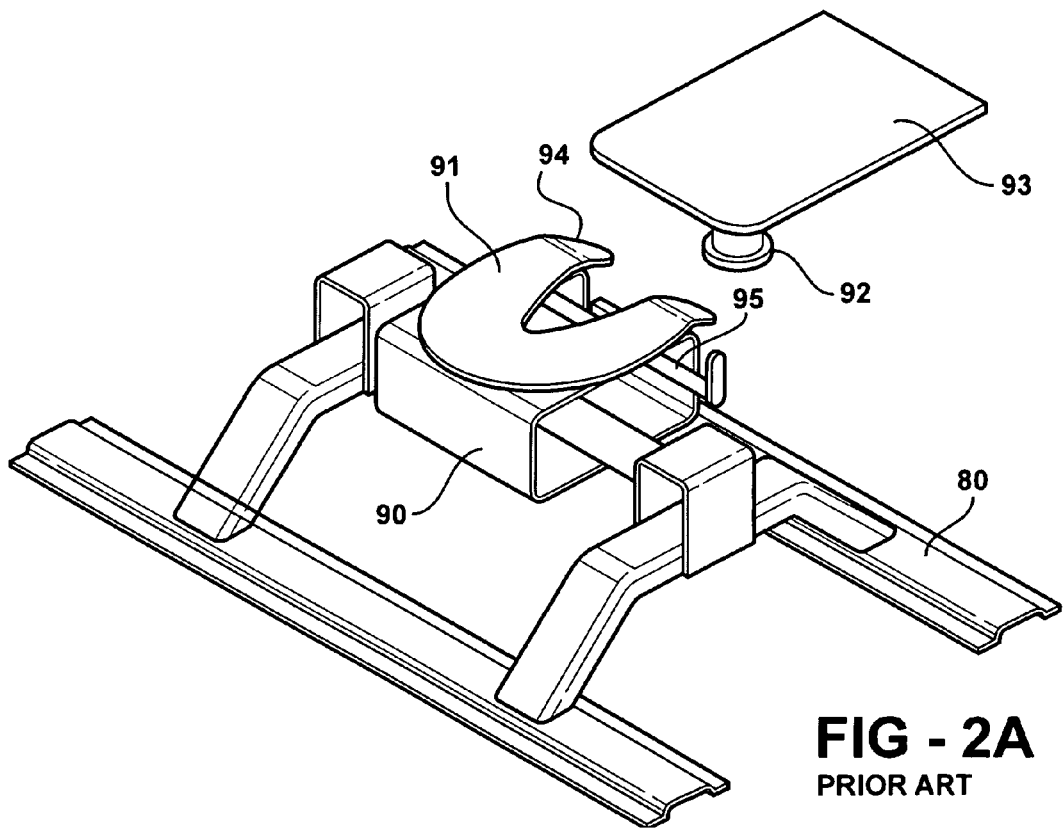
FIG. 2A is a perspective view of a prior art fifth wheel type of hitch mechanism.
Figure 2B:
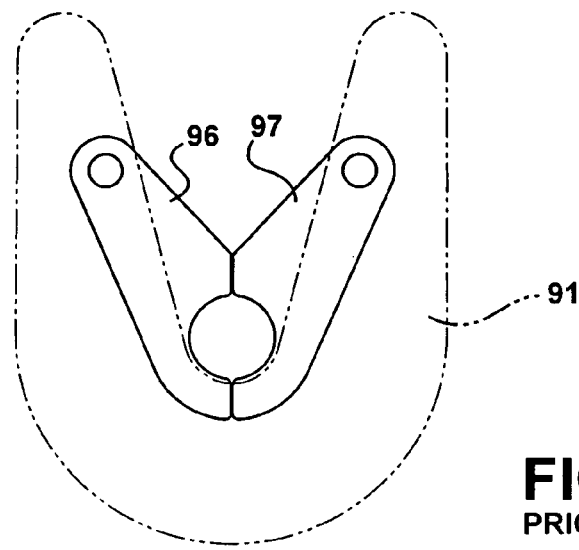
FIG. 2B is a top plan view of a prior art fifth wheel type of hitch mechanism.
Figure 3:
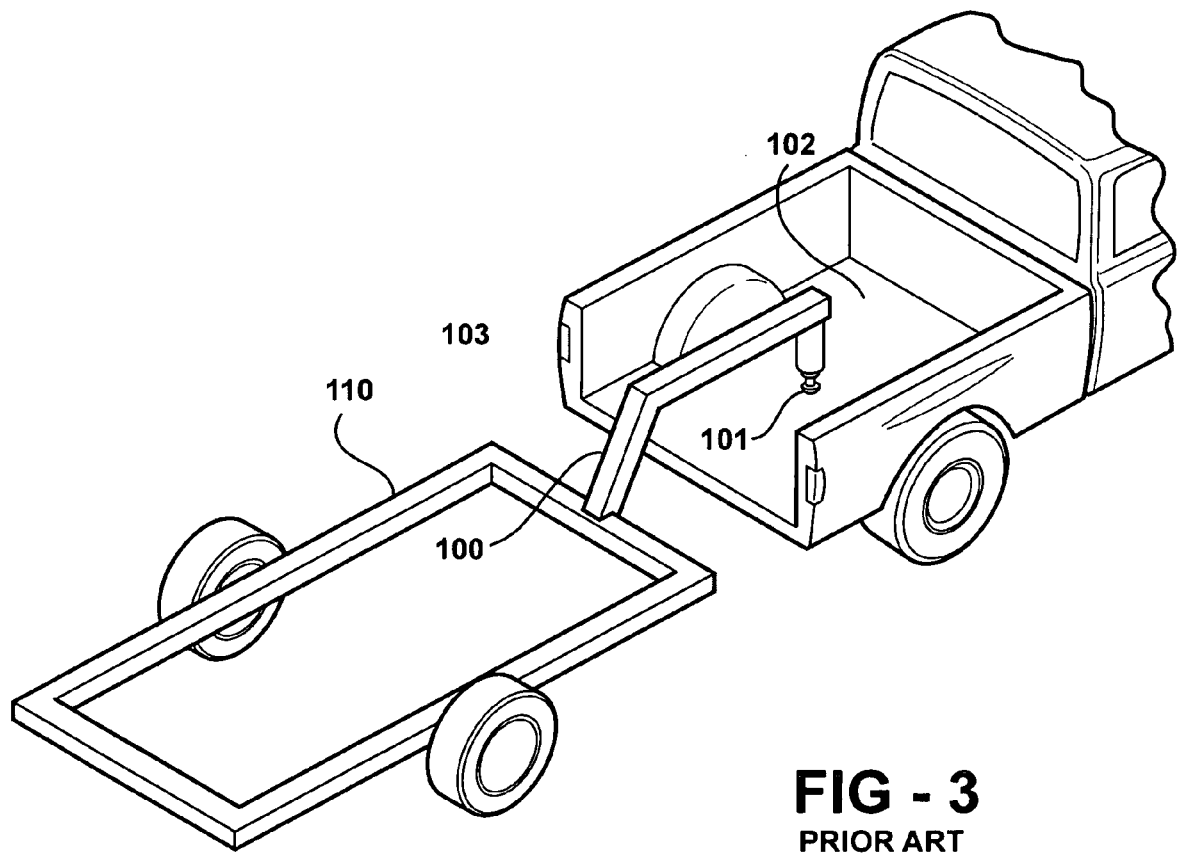
FIG. 3 is a perspective view of a prior art goose neck type of hitch mechanism.
Figure 4:
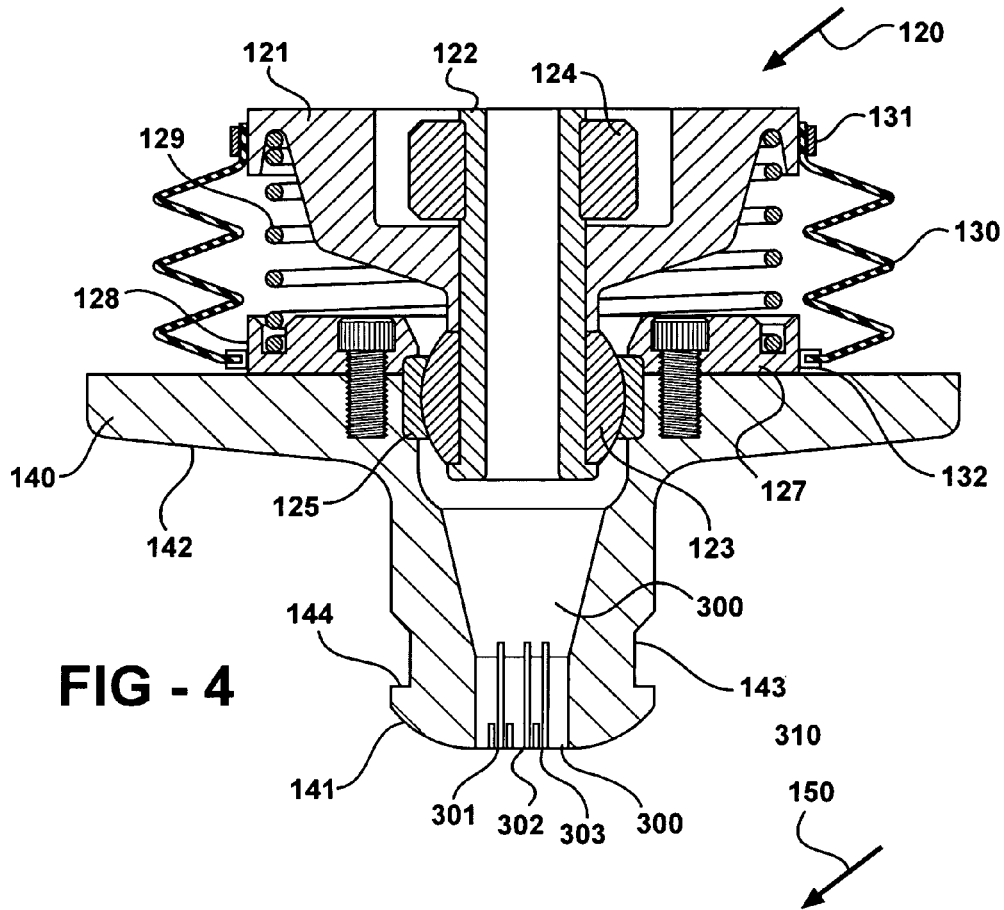
FIG. 4 is a partial sectional view of the hitch pin assembly of the hitch coupling unit of the present invention.
Figure 5:
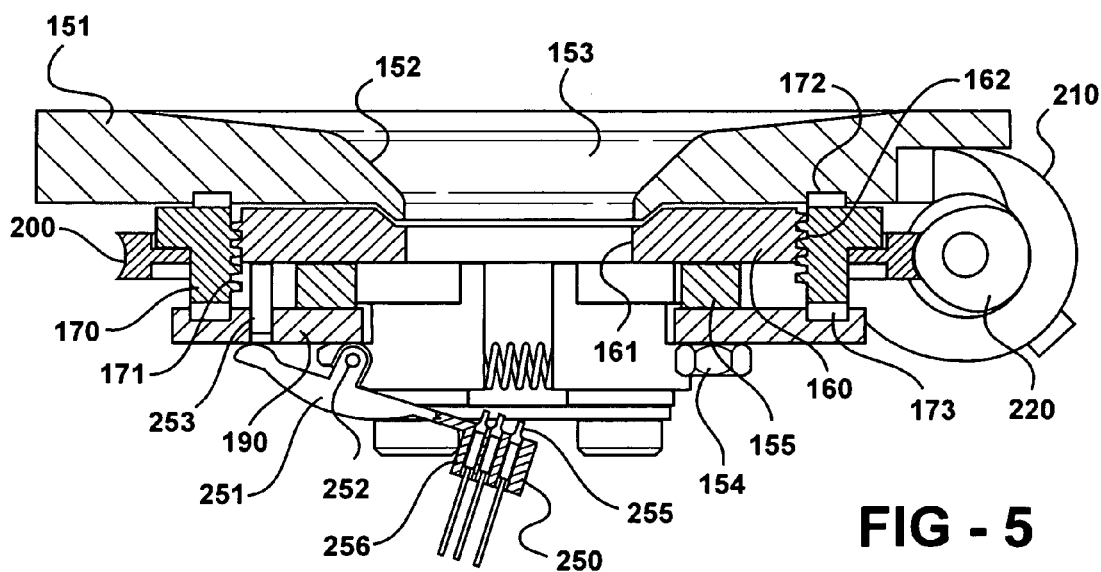
FIG. 5 is a partial section view of the hitch receiver assembly of the hitch coupling unit of the present invention.

The preferred embodiment of the invention is illustrated in FIGS. 4 and 5. The basic construction consists of these two assemblies. A hitch pin with articulation, as shown in FIG. 4, and a hitch receiver, as shown in FIG. 5, to locate and capture the hitch pin.

The hitch pin assembly (120) is connected to the trailer frame via the mounting plate (121), which acts as an articulation limiter. The preferred method is to fasten this on to the frame using bolts but a welded connection would be acceptable. A core pin (122) connects the ball of the spherical bearing (123) to the mounting plate (121) and is secured by a nut (124). The spherical bearing race (125) is recessed into the hitch pin (140) and is held in place by the bearing cap (127). This bearing cap (127) also has a groove (128) machined around the perimeter for an alignment spring (129). This alignment spring (129) is located between the bearing cap (127) and the mounting plate (121), and its function is to keep the hitch pin (140) in the proper orientation during the connection operation. Surrounding the spring (129) and connected to the outer portion of the mounting plate (121) is a rubber bellows (130). This bellows (130) is attached by a clamp (131) and moves with the mounting plate (121). The lower end of the bellows (130) has a lip-seal (132) attached that slides up and down on the outer surface of the bearing cap (127). This provides a seal to eliminate any dirt from entering the hitch pin assembly (120). The hitch pin (140) makes the actual alignment and connection to the hitch receiver (150) by means of the tapered platform section (142) resting on the profiled platform of the bed plate (151). The bull nose projection (141) has a recess groove (143) cut into it with a square shoulder (144) to provide a clamping surface for the locking arms (229) and (230).

The hitch receiver (150) assembly is connected to the vehicle frame by the bed plate (151). The top surface of the bed plate (151) is sloped down (152) towards the center with a large opening (153) to accept the hitch pin bull nose (141). Screwed into the bottom of the bed plate (151) are three bolts (154) that hold in place three bearing guides (155). Sliding up and down on these guides is a locking plate (160). The locking plate is a round metal plate with a center opening (161) of similar diameter to that of the opening in the bed plate (151). A male thread (162) is cut on the outside of the locking plate (160). The outer actuator (170) is a tubular ring that is positioned around the locking plate and has a female thread (171) that mates with the thread on the locking plate (162). The outer actuator (170) is held in place by thrust bearings (172) and (173) on the top and bottom surfaces. The top bearing (172) is mounted into a groove machined in the underside of the bed plate (151). The bottom bearing (173) is mounted in a groove on the upper surface of a plate called the bottom support (190). The outer actuator (170) is captive between the bed plate (151) and the bottom support (190) so that it can move with a rotational motion only. A worm gear (200) is bolted to the circumference of the outer actuator (170). A motor (210) and worm (220) assembly is mounted to the underside of the bed plate (151) and is meshed to the worm gear (200) connected to the outer actuator (170).

Figure 6:
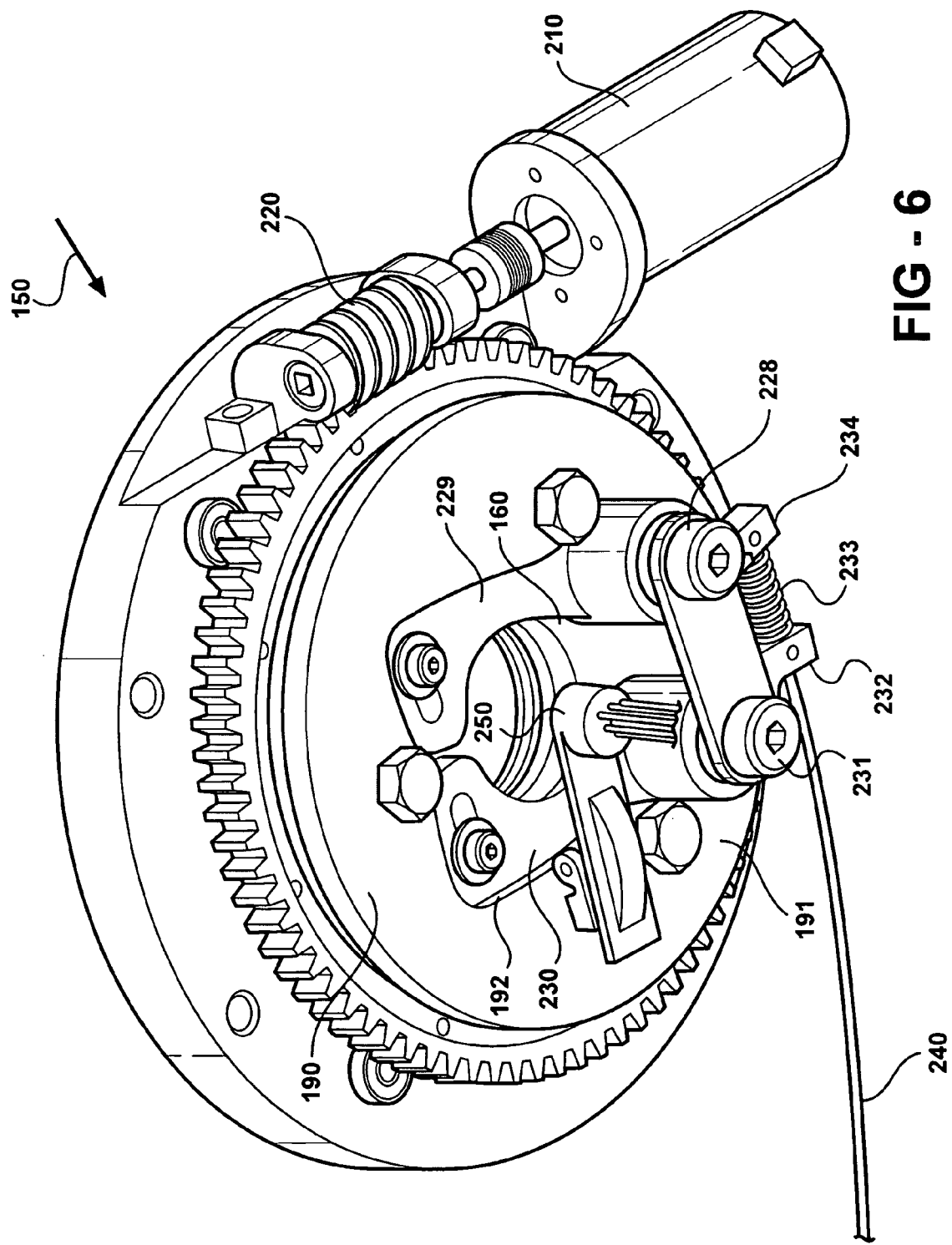
FIG. 6 is a perspective view of the underside of the hitch receiver of FIG. 5.
Figure 7:
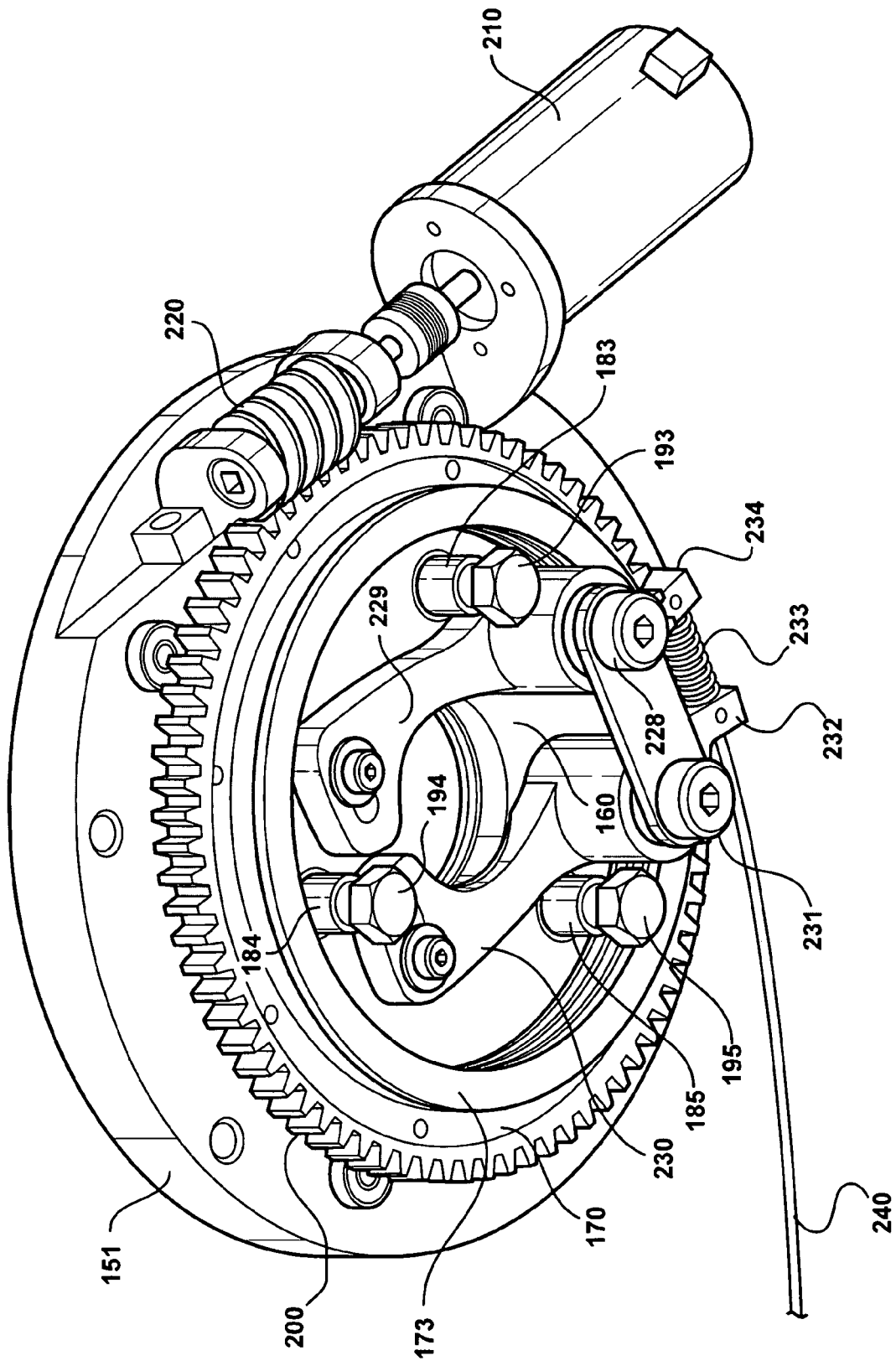
FIG. 7 is another perspective view of the underside of the hitch receiver of FIG. 5.
Figure 8:
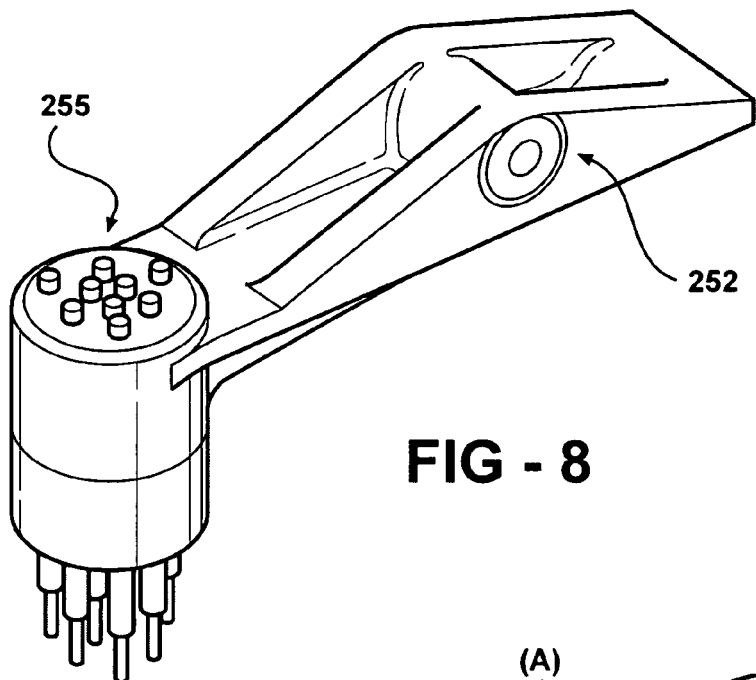
FIG. 8 is a top view of another embodiment of the connector pin body assembly.

Referring to FIGS. 6 and 7, two locking arms (229) and (230) are attached to the underside of the locking plate (160) and are each pinned (228) and (231) at one end. A short arm (232) and (234) extends in the opposite direction on each arm (229) and (230) and a compression spring (233) is inserted between them to force them apart. This in turn forces the opposite ends of the locking arms (229) and (230) together with a scissor action. The shape of the locking arms (229) and (230) is such that they can be forced open during the insertion of the hitch pin (120) and will also close tightly around the neck section (143) of the hitch pin. A bottom support (190) consisting of a flat plate held in place by the three slide bearing bushings (183), (184) and (185) and their corresponding bolts (193), (194) and (195). This bottom support (190) has a cutout (192) that matches the profile of the two locking arms (229) and (230) when in the closed position. A cable mechanism (240) is installed to compress the spring (233) and open the locking arms (229) and (230). This cable mechanism (240) is routed so that the handle is in a location to provide visible confirmation that the hitch pin is locked.

An electrical connector (250) is mounted to the lower surface of the bottom support (190) by means of a pivoting lever (251). It is normally held open by means of a small coil spring (252). A push rod (253) is located in a hole in the bottom support (190). Internal to the electrical connector (250) are a series of contactors (255) each backed up with a small internal coil spring (256). The mating half of the connector (300) inside the hitch pin has three circular conductors (301), (302) and (303). These conductors match the location of the spring pins (255) in the receiver connector (250).

A modified version of the electrical connection arrangement is illustrated in FIGS. 8-11. In this embodiment, the electrical connection relies on the alignment of three concentric rings, to three groups of three spring-loaded pins. Three pins per group are used to increase the current capacity and to provide some redundancy as a failsafe. The three circuits are required to provide ground, 12V power, and the serial bus signal.

Figure 9:
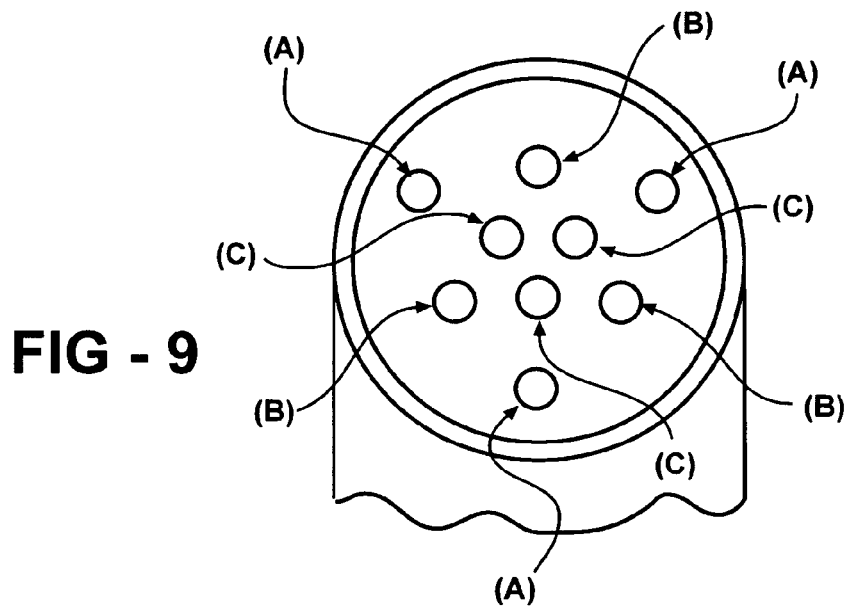
FIG. 9 is a perspective view of the spring loading arrangement for the connector pins.
Figure 10:
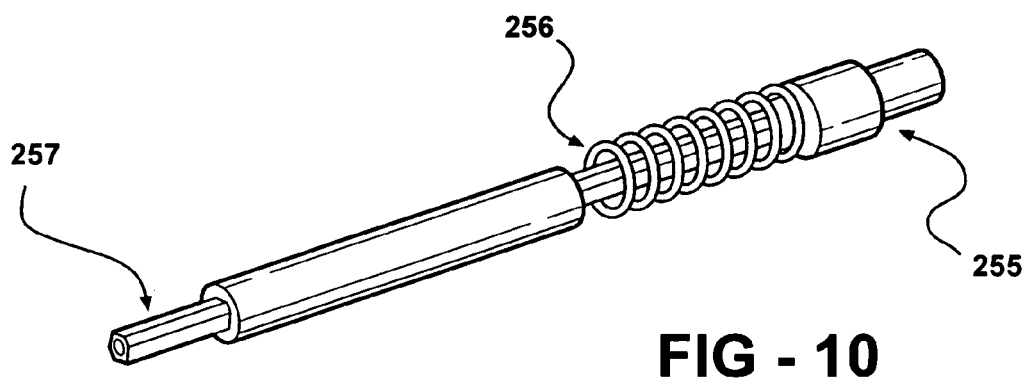
FIG. 10 is a perspective view of the modified pin connector assembly.

The three sets (A, B, C) of three pins are arranged in a triangular fashion. The middle set (B) is orientated 180° from the outer (A) and inner set (C). This arrangement provides sufficient spacing between the pins for the spring assembly (shown in FIG. 9) and to ensure that no overlap exists between the separate circuits. FIG. 9 shows the assembly for the pin connector (250). The nine pins (255) extend out the top of the connector body and are arranged in three triangles, as previously described. FIG. 10 also shows the electrical connector pin (255) that makes contact with the connector (300') of FIG. 11. This pin (255) is soldered to a copper wire (257) to carry the current to the connector. The pin (255) is pushed against the connector rings by the spring (256) to ensure good contact.

Figure 11A:
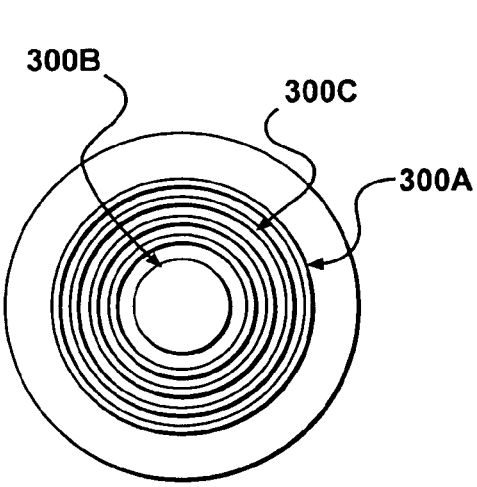
FIG. 11 is a top and perspective view of the modified connector and three conducting rings.
Figure 11B:
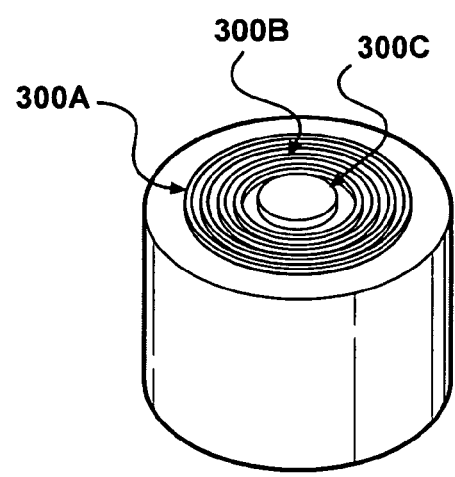

FIG. 11 shows two views of the connector (300') and three conducting rings 300A, 300B, 300C. The outer ring 300A is used for ground. The middle ring (300B) is used for +12V and the inner ring (300C) is used to send a digital signal over a serial bus network for various trailer electrical functions.

In a general sense, the concentric ring portion can be in either the hitch pin or the receiver. Each of the concentric rings is connected to a wire or multiple wires and the assembly is potted in an electrically isolating epoxy. This epoxy forms the body of one half of the connector and ensures that the rings are separated and located properly.

In the preferred embodiment of the invention, as illustrated in FIG. 4, a pin assembly (120) comprised of a mounting plate (121) a spherical bearing (123) for swivel connection, a stiff alignment spring (129), a hitch pin (140) with a shallow taper (142) for alignment and a bull nose (141) with a grooved section (143), with a clamping shoulder (144), a rubber bellows cover (130) and a three conductor electrical connector (300) running through the center hole of the pin (310) is connected to the trailer.

Connected to the truck bed, as shown in FIG. 5, is a receiver assembly (150) comprised of a tapered bed plate (151), a threaded locking plate (160) with scissor action locking arms (229) and (230) to grab the hitch pin (140), an outer actuator (170) with a matching thread (171) to cinch down the locking plate (160), a worm (220), worm gear (170) and motor assembly (210) to turn the outer actuator (170), a bottom plate (190) with a matched cutout profile (192) to hold the locking arms (229) and (230) in a closed position, a release cable (240) to open the spring loaded (233) locking arms (229) and (230), a self guiding three conductor electrical connector (250) to mate with the connector (300) in the hitch pin (140).

In the hitching procedure, referring to FIGS. 4, 5, 6 and 7, the trailer is lowered so the hitch pin (140) contacts the tapered section (152) of the bed plate (151). The weight of the trailer combined with the slope (152) of the bed plate (151) cause the hitch pin bull nose (141) to slide into the center opening (153) in the bed plate (151). The trailer is lowered all the way so that the profiled platform (142) rests on the bed plate (151). The bull nose section (141) of the hitch pin (140) will push the locking arms (229) and (230) apart as it slides in and they will spring closed around the neck section (143) of the pin. The hitch pin (140) is caught by the locking arms (229) and (230) clamped against the square shoulder (144) and will not release unless the locking arms (229) and (230) are opened manually by pulling the release cable (240) and compressing the spring (233). Energizing the worm gear motor (210) causes the worm gear (200) and outer actuator (170) to rotate and drive the locking plate (160) and locking arms (229) and (230) down. This causes the hitch pin (140) to be drawn down tight to the bed plate (151). The locking arms (229) and (230) are now positioned inside of the cutout (192) in the bottom plate (190) and are unable to open. This effectively results in a failsafe method of securing the hitch pin (120) to the hitch receiver (150) without the possibility of it becoming disconnected.

During the hitching procedure, the internally mounted electrical connector (300) in the hitch pin (120) is automatically connected to the mating connector (250) in the hitch receiver (150). The lowering of the locking plate forces the push pin (253) down thereby rotating the pivoting arm (251) and moving the electrical connector (250) up into the hitch pin connector (300) to complete the electrical contact. This is done without any operator involvement and is invisible to the operator.

Release of the hitch pin (120) is done by reversing the direction of rotation of the outer actuator (170) in order to move the locking plate (160) up towards the bed plate (151). This also raises the locking arms (229) and (230) above the cutout profile (192) in the bottom plate (190) allowing them to open. The locking arms (229) and (230) are opened manually by a cable mechanism (240) allowing the hitch pin (120) to be raised out of the bed plate (151) when the trailer is jacked up. The electrical connector (250) is automatically disconnected during the unhitching procedure. When the locking plate (160) is moved up, the push-pin (253) retracts with it and allows the pivoting lever (251) to rotate and move the electrical connector (250) away from the connector (300) in the hitch pin (140).

Figure 12:
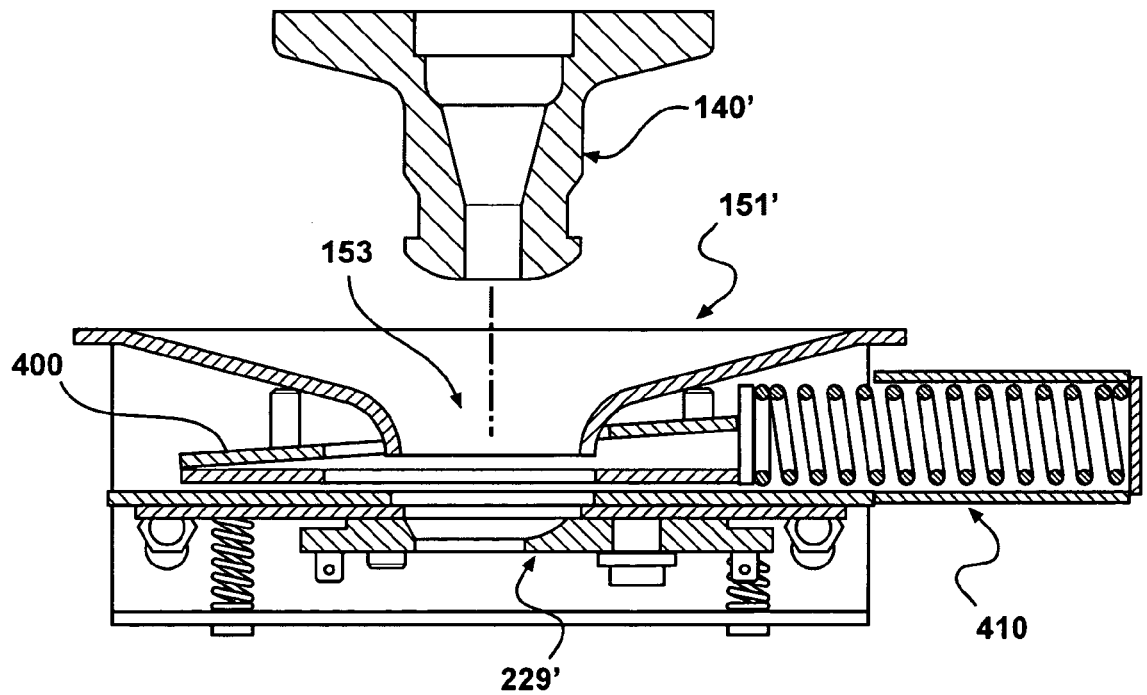
FIG. 12 is an alternate embodiment of the hitch pin assembly and the hitch receiver assembly wherein the clamping is achieved by a wedging action.
Figure 13:
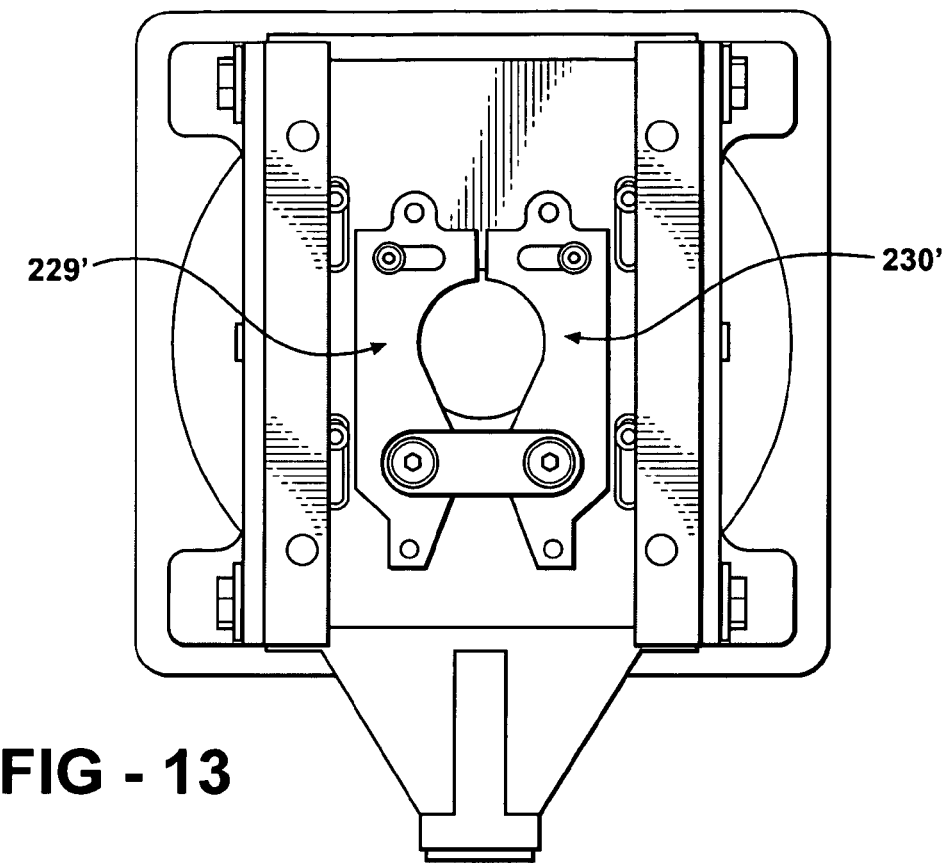
FIG. 13 is a bottom view of the underside of the hitch receiver illustrating the locking arms.
Figure 14:
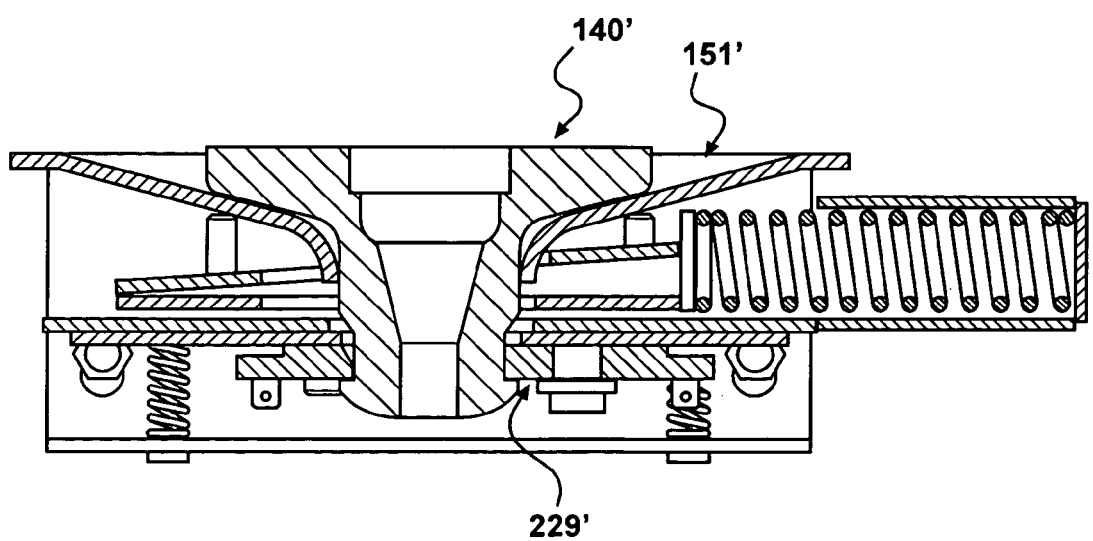
FIG. 14 is a partial section view of the hitch pin assembly held in place in the hitch receiver assembly.

In another embodiment of the invention, shown in FIGS. 12 to 14, clamping of the hitch pin to the hitch receiver assembly is achieved by the use of a wedge (400). The hitch pin (140') is similar to the previous embodiment, but the bed plate (151') is now a stamped component forming the taper shape required to guide the hitch pin (140') into the opening (153'). When the hitch pin is seated on the bed plate, the wedge is pushed forward by the spring (410). This bias forces the locking arms (229', 230'), illustrated in FIG. 13, to be pushed down and clamp the hitch pin (140') tightly against the bed plate (151'), as illustrated in FIG. 14.

Figure 15:
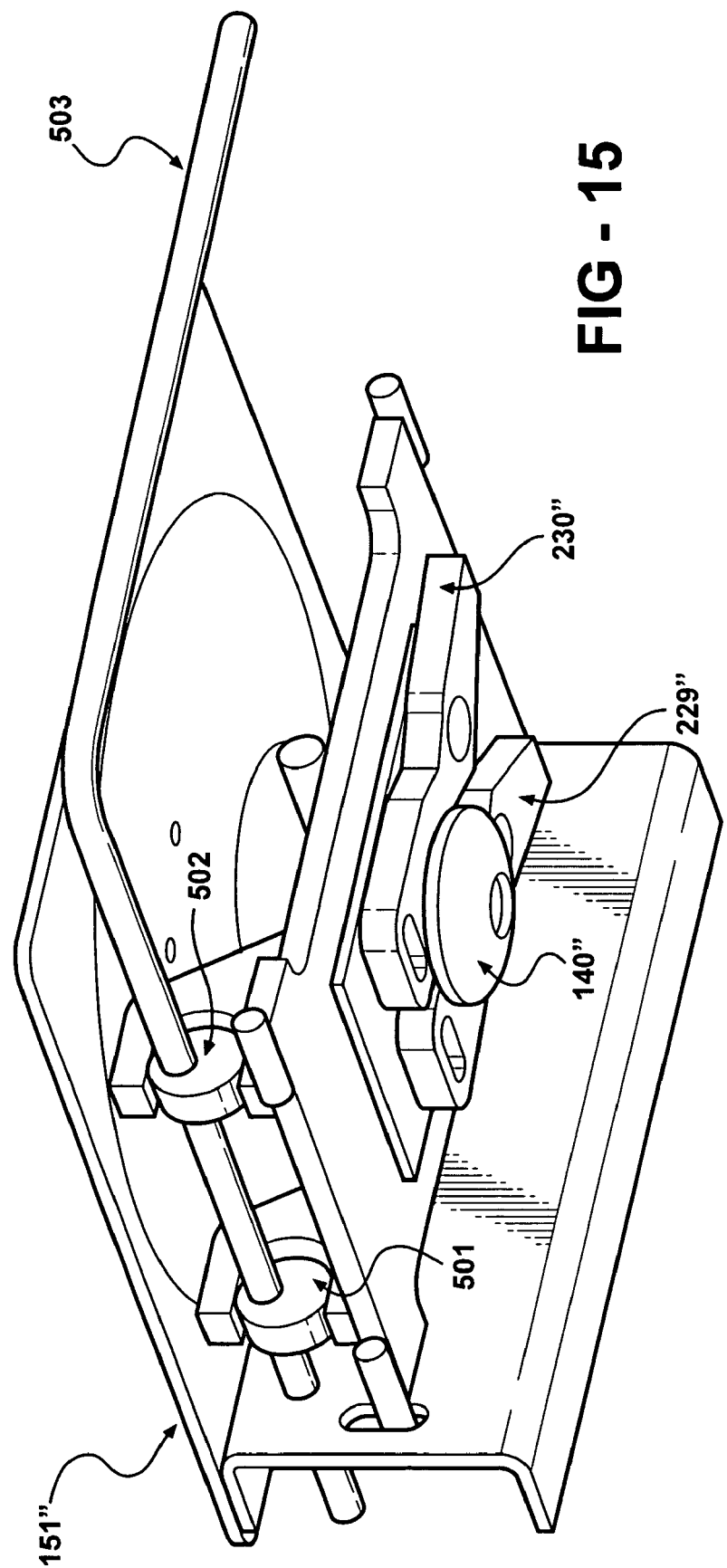
FIG. 15 is yet another alternate embodiment of the hitch pin assembly and the hitch receiver assembly wherein the clamping is achieved by a camming action.

In yet another embodiment of the invention, illustrated in FIG. 15, cams (501, 502) is used to lower the locking arms (229", 230") and lock the hitch pin (140") tightly to the bed plate (151"). The cams (501, 502) can be rotated by a lever arm (503) or electrically by various other means known in the art.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

The invention claimed is:

1. A trailer hitch coupling unit comprising:
    a hitch pin assembly comprising:
        a mounting plate configured to be mounted to a trailer,
        a hitch pin platform, said platform and said mounting plate having a ball and socket joint, rotatably coupling said platform to said mounting plate,
        a bull nose projecting from the platform, said bull nose having a groove,
        a first electrical connector mounted in an axially extending bore in said bull nose; and
    a hitch receiver assembly comprising:
        a bed plate configured to be mounted on a bed of the vehicle above a rear axle thereof, said bed plate having a first opening configured to received said bull nose,
        a locking plate mounted on said bed plate for axial movement between a hitch pin receiving position adjacent said bed plate, and a hitch locking position spaced from said bed plate, said locking plate having a second opening configured to receive said bull nose,
        an actuator operably connected to said locking plate for effecting said axial movement,
        a locking mechanism mounted on said locking plate, said locking mechanism comprising at least two locking arms mounted about said second opening, said locking arms pivot between a locked position and an unlocked position and are biased to said locked position, enabling ingress of said bull nose and preventing egress once the locking arms engage the groove on said bull nose,
        a lock release mechanism operably connected to said locking arms to effect unlocking movement of said locking arms and enabling egress of said bull nose, and
        a second electrical connector pivotally mounted on said locking plate and positioned to electrically couple with said first electrical connector upon said locking plate moving to said hitch locking position.

2. A trailer hitch coupling unit according to claim 1, further comprising spring mounted between the mounting plate and platform maintaining the bull nose in a generally vertical position.

3. A trailer hitch coupling unit according to claim 2, wherein said locking plate is threadably mounted to said bed plate.

4. A trailer hitch coupling unit according to claim 3, further comprising a pull cable mechanism operably connected to said locking arms to open the locking arms.

* * * * *